United States Patent [19]

Eckhardt et al.

[11] Patent Number: 4,667,011

[45] Date of Patent: May 19, 1987

[54] THERMOTROPIC AROMATIC POLYESTERS HAVING HIGH MECHANICAL PROPERTIES AND GOOD PROCESSABILITY, A PROCESS FOR THEIR PREPARATION, AND THEIR USE FOR THE PRODUCTION OF MOULDINGS, FILAMENTS, FIBRES AND FILMS

[75] Inventors: Volker Eckhardt; Hans-Rudolf Dicke, both of Krefeld; Klaus-Christian Paetz, Burscheid; Aziz El Sayed, Leverkusen, all of Fed. Rep. of Germany

[73] Assignee: Bayer Aktiengesellschaft, Leverkusen, Fed. Rep. of Germany

[21] Appl. No.: 860,475

[22] Filed: May 7, 1986

[30] Foreign Application Priority Data

May 18, 1985 [DE] Fed. Rep. of Germany ....... 3517948

[51] Int. Cl.$^4$ .................. C08G 8/02; C08G 63/60

[52] U.S. Cl. .................. 528/128; 528/125; 528/126; 528/176; 528/193; 528/194; 528/195

[58] Field of Search .................. 528/125–126, 528/128, 176, 193, 194, 195

[56] References Cited

U.S. PATENT DOCUMENTS

| 4,269,965 | 5/1981 | Irwin | 528/128 |
| 4,500,699 | 2/1985 | Irwin et al. | 528/128 |
| 4,600,764 | 7/1986 | Dicke et al. | 528/128 |
| 4,614,789 | 9/1986 | Dicke et al. | 528/128 |
| 4,617,369 | 10/1986 | Huynh-Ba | 528/128 |

Primary Examiner—Lucille M. Phynes
Attorney, Agent, or Firm—Connolly and Hutz

[57] ABSTRACT

Fully aromatic polyesters which contain 3-phenyl-4,4'-dihydroxybenzophenone radicals and/or 3-phenyl-3',4-dihydroxybenzophenone radicals as condensed units possess high mechanical properties but can still be processed without difficulties by a thermolastic method.

10 Claims, No Drawings

THERMOTROPIC AROMATIC POLYESTERS HAVING HIGH MECHANICAL PROPERTIES AND GOOD PROCESSABILITY, A PROCESS FOR THEIR PREPARATION, AND THEIR USE FOR THE PRODUCTION OF MOULDINGS, FILAMENTS, FIBRES AND FILMS

The invention relates to high molecular weight thermotropic fully aromatic polyesters having high strength, stiffness and impact strength and a low melting point and melt viscosity, a process for their preparation, and their use for the production of mouldings, filaments, fibres and films.

Substances which are designated as "thermotropic" are those which form liquid-crystalline melts. Thermotropic polycondensates are Sufficiently well known; see, for example, F. E. McFarlane et al., Liquid Crystal Polymers II, Contemporary Topics in Polymer Science, Vol. 2, Plenum Publishing Corporation, 1977;

W. J. Jackson and H. F. Kuhfuss, J. Polymer Science, Polymer Chem. Ed. 14, 2042 (1976);

W. C. Wooten et al., in A. Cifierri "Ultra-high Modulus Polymers", Applied Science Publ., London 1979, page 362 et seq.;

A. Blumstein et al., "Liquid Crystalline Order in Polymers", Academic Press 1978;

J. Preston, Angew. Makromol. Chem. 109/110, pages 1-19 (1982);

A. Ciferri, W. R. Krigbaum, R. B. Meyer "Polymer Liquid Crystals", Academic Press New York, 1982;

EP-A No. 1185, 1340, 8855, 11 640, 15 856, 17 310, 18 145, 18 709, 22 344, 44 205, 49 615, 26 991;

U.S. Pat. Nos. 3,991,013, 3,991,014, 4,066,620, 4,067,852, 4,083,829, 4,107,143, 4,226,970, 4,232,143, 4,232,144, 4,245,082, 4,335,232, 4,381,389, 4,399,270, 4,398,015 and 4,447,592; and WO Nos. 79/797, 79/1030, 79/1040.

The liquid-crystalline state of polyester melts can be investigated with the aid of a polarization microscope. For the investigations, the eyepiece was equipped with an attachment which contained a photodiode arranged at the focus of the ocular lens. Using a downstream amplifier with a control device, the measured value for the switched-on microscope with parallel Nicol prisms and in the absence of a sample of material was set to 100 scale divisions. A value of 0.01 scale divisions was then obtained with crossed Nicol prisms.

The layer thickness of the polyester melts investigated was 100 μm.

The polyesters were investigated after samples had been melted at temperatures between 280° and 400° C. If lightening of the melt observed between the crossed Nicol prisms occurred in this entire range or in a part of it, the polycondensate was classified as thermotropic liquid-crystalline.

In the measuring arrangement, the liquid-crystalline polyesters give values greater than 1 scale division, in general values of 3-90 scale divisions. On the other hand, for amorphous melts, for example aromatic polycarbonates, values of less than 0.1 scale divisions were found.

The method described above is particularly suitable for a rapid determination in the laboratory, and gives unambiguous results in virtually all cases. In cases of doubt, on the other hand, it may be reasonable to demonstrate the presence of liquid-crystalline components by means of wide-angle X-ray scattering in the melt, as described in, for example, G. W. Gray and P. A. Windsor, "Plastic Crystals, Physico-Chemical Properties and Methods of Investigation", in particular Chapter 3, John Wiley & Sons, New York, Sidney, Toronto 1974.

DE-OS (German Published Specification) No. 2,025,971 relates to high molecular weight fully aromatic polyesters based on p-hydroxybenzoic acid, aromatic dicarboxylic acids (such as terephthalic or isophthalic acid) and diphenols (such as hydroquinone or 4,4'-dihydroxybiphenyl). Because of the components used, these polyesters are thermotropic; they can be processed to, for example, fibres. Of the 13 polyesters of the examples, only one melts at below 300° C. These polyesters are therefore difficult to process.

Moulding produced from a liquid-crystalline melt have mechanical strengths not normally found in the case of non-reinforced polycondensates processed from an isotropic melt; however, the impact strength of such mouldings is unsatisfactory in some respects (see U.S. Pat. No. 4,242,496, European Patent No. 44,175, and W. J. Jackson Jr., Br. Polym, J. 12, 154 (1980)).

Our own investigations have confirmed that thermotropic polyesters of high flexural strength as a rule possess a low inpact-strength, and thermotropic polyesters of high impact strength as a rule possess less pronounced flexural strength.

It was therefore the object of the invention to provide thermotropic, fully aromatic polyesters which possess better processability than the polyesters of DE-OS (German Published Specification) No. 2,025,971 but still have high mechanical properties.

It was a further object of the invention to provide thermotropic, fully aromatic polyesters which can be processed by thermoplastic deformation to give mouldings which possess both high mechanical strength and great impact strength.

Preferred new thermotropic, fully aromatic polyesters should be capable of being processed by a thermoplastic method at a temperature below 350° C., preferably below 330° C., and particularly preferably below 300° C.

Preferred new fully aromatic polyesters should possess an impact strength of at least 20, preferably of at least 30, in particular of at least 50, kJ/m². Moreover, these preferred polyesters should have a notched impact strength of at least 10, preferably of at least 20, in particular of at least 30, kJ/m². Furthermore, these preferred polyesters should possess a flexural strength of at least 150, preferably of at least 180, in particular of at least 200, MPa.

Surprisingly, it has been found that the desired combination of advantageous properties is obtained when the fully aromatic polyesters contain 3-phenyl-4,4'-dihydroxybenzophenone radicals and/or 3-phenyl-3',4-dihydroxybenzophenone radicals as condensed units.

The invention relates to thermotropic aromatic polyesters having repeating units of the formulae

$$-O-Ar^3-O- \quad (III)$$

wherein $Ar^1$ and $Ar^2$ are bivalent aromatic radicals having 6 to 18 C atoms, at least 90 mol% of the chain-extending bonds of which radicals are arranged coaxially or parallel in opposite directions, and at most 10 mol% of the chain-extending bonds of which radicals are arranged at angles, it being possible for these radicals to be substituted by 1 to 4 $C_1$-$C_4$-alkoxy groups (preferably methoxy) and/or by 1 to 4 halogen atoms (preferably fluorine, chlorine or bromine), the molar ratio I/II being 30:70 to 85:15, preferably 45:55 to 80:20, in particular 60:40 to 78:22, and the molar ratio II/III being 0.95 to 1.05, preferably 0.98 to 1.02, in particular 1.0, characterized in that $-O-Ar^3-O-$ consists of at least 50 mol%, preferably at least 70 mol%, in particular at least 90 mol%, of radicals of the formula

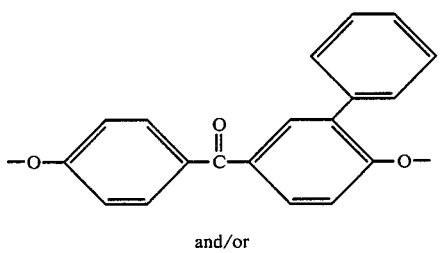

(IV)

and/or

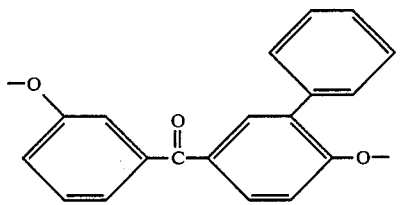

(V)

and at most 50 mol%, preferably at most 30 mol%, in particular at most 10 mol%, of other bivalent aromatic radicals, the chain-extending bonds of which are arranged at angles, but preferably coaxially or parallel in opposite directions and the radicals having 6 to 18 C atoms, it being possible for these radicals to be substituted by 1 to 4 $C_1$-$C_4$-alkoxy groups (preferably methoxy) and/or 1 to 4 halogen atoms (preferably fluorine, chlorine or bromine).

When using hydroxycarboxylic acids and dicarboxylic acids which lead to radicals $Ar^1$ and $Ar^2$, the chain-extending bonds of which are at angles, an amount which causes a loss of the thermotropic properties of the resulting polyesters is not exceeded.

Examples of preferred compounds which lead to condensed radicals having bonds at angles are m-hydroxybenzoic acid and isophthalic acid.

When using diphenols which, when incorporated, do not lead to units IV or V, care should be taken to ensure that the temperature at which the resulting polyesters can be processed by a thermoplastic method does not exceed 350° C., preferably does not exceed 330° C., in particular does not exceed 300° C.

Preferred hydroxycarboxylic acids which lead to units I are, for example, 6-hydroxy-2-naphthoic acid, 4-hydroxy-1-naphthoic acid, 5-hydroxy-1-naphthoic acid, 4'-hydroxy-4-biphenylcarboxylic acid, 4-hydroxy-transcinnamic acid, 3-chloro-4-hydroxybenzoic acid, 3-methyl-4-hydroxybenzoic acid, 3-phenyl-4-hydroxybenzoic acid, 3-methoxy-4-hydroxybenzoic acid and 3-methoxy-4-hydroxycinnamic acid. 4-Hydroxybenzoic acid is particularly preferred. Preferred aromatic dicarboxylic acids which lead to units II are, for example, 2,6-naphthalenedicarboxylic acid, 1,4-naphthalenedicarboxylic acid, 1,5-naphthalenedicarboxylic acid, 4,4'-biphenyldicarboxylic acid, 4,4'-terphenyldicarboxylic acid, 4,4'-trans-stilbenedicarboxylic acid, 4,4'-tolanedicarboxylic acid, 4,4-azobenzenedicarboxylic acid, methylterephthalic acid, methoxyterephthalic acid, chloroterephthalic acid and phenylterephthalic acid. Terephthalic acid is particularly preferred.

Preferred diphenols which lead to units II which are not identical to structure IV or V are, for example, resorcinol, 4,4'-dihydroxydiphenyl, -diphenyl ether and -diphenyl sulphide, 4,4'-dihydroxybenzophenone and in particular hydroquinone.

The polyesters according to the invention can contain up to 10 mol%, relative to the sum of ester and carbonate groups, of carbonate groups.

The polyesters according to the invention can contain the radicals I to III in random distribution, in segments or in blocks. Regarding component I, it should be noted that relatively long blocks can greatly increase the melting point and the melt viscosity.

The polyesters according to the invention can contain, as terminal groups, —COOH, —H, —OH, —$OC_6H_5$, acyloxy or radicals derived from chain terminators. Preferred chain terminators are monofunctional aromatic hydroxy compounds, such as 4-hydroxydiphenyl, p-nonylphenol, 4-(1,1,3,3-tetramethylbutyl)-phenol and β-naphthol, and aromatic monocarboxylic acids, such as diphenylcarboxylic acids and naphthalenecarboxylic acids. Chain terminators can be employed in amounts of 0.5 to 5 mol%, based on the sum of components I and II.

It is also possible to use branched trifunctional monomers or monomers having a higher functionally—preferably aromatic monomers—in amounts of 0.1 to 1 mol%, relative to the sum of components I and II, such as, for example, phloroglucinol, 1,3,5-benzenetricarboxylic acid and 3,5-dihydroxybenzoic acid.

The polyesters according to the invention possess, as a rule, an intrinsic viscosity of at least 0.8, preferably of at least 1.4, dl/g (measured on a solution of 5 mg of polyester/ml of p-chlorophenol at 45° C.). If the polyesters are insoluble in p-chlorophenol, it is assumed that they possess the stated minimum viscosity; they therefore conform to the invention, provided that they satisfy the parameters of the principal claim.

The polyesters according to the invention preferably possess a melt viscosity of less than 1000 Pa.s, measured at a shearing rate of $10^3$ s$^{-1}$ using a nozzle having a length/diameter ratio of 20, at a temperature of less than 350° C., preferably less than 330° C.

The polyesters according to the invention can be prepared by various methods, for example by condensation or transesterification of the reactive derivatives of the radicals I to III, for example their esters or acid chlorides, followed by polycondensation.

Examples of preferred starting compounds are therefore their aryl esters, their acyl esters (preferably their acetates) and their acid chlorides.

In a preferred method of synthesis, the $C_1$-$C_4$-acyl esters, preferably the acetates, of the radicals I and III are reacted with the dicarboxylic acids of the radicals II, it also being possible to prepare the acyl esters in situ. These reactions can be carried out in the melt phase;

however, the reaction is also possible in the presence of a liquid heat-transfer medium which has a high boiling point.

The radicals I to III are incorporated into the polyester in a ratio corresponding to that of the appropriate starting components.

It may be advantageous catalytically to accelerate both the condensation or transesterification reactions and the polycondensation reactions. Catalysts of this type are known to be, for example, Lewis acids and hydrohalic acids; oxides, hydrides, hydroxides, halides, alcoholates, phenolates, salts of inorganic or organic acids (preferably salts of carboxylic acids), complex salts or mixed salts of the alkaline earth metals, such as, for example, magnesium calcium; of the sub-group elements, such as, for example vanadium, titanium, manganese, cobalt, nickel, zinc, lanthanum, cerium or zirconium, or of elements from other groups of the Periodic Table, such as for example, germanium, tin, lead and antimony, or the alkali metals or alkaline earth metals themselves, in particular sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl $C_1$-$C_8$-alkoxides, titanium alkoxides, such as titanium tetrabutylate or titanium tetrapropylate, alkoxytitanium silicates, zirconium butylate, zirconium propylate, titanium tetraphenolate, sodium phenolate, germanium dioxide, antimony trioxide, dialkyl- and diaryl-tin oxide, di-butyl-tin diacetate and di-butyl-dimethoxy-tin. Magnesium acetate, manganese acetate, sodium acetate, potassium acetate and zinc acetate are particularly preferred.

The amounts of catalyst are preferably 0.001 to 1, in particular 0.01 to 0.2, % by weight, relative to the total weight of the monomers used.

The polyesters according to the invention can be prepared at temperatures from 160° to 350° C., the reaction generally being started at low temperatures, and the temperature being increased continuously as the reaction progresses. When the reaction rate decreases, a vacuum can be applied, the pressure preferably being reduced continuously from atmospheric pressure to about 0.1 mbar.

The product obtained can be subjected—preferably in the form of granules—to a subsequent solid phase postcondenstion under reduced pressure at temperatures from 200° to 300° C.; after 1 to 25 hours, the molecular weight has increased.

The invention therefore furthermore relates to a process for the preparation of the new polyesters by reaction of the hydroxycarboxylic acids, dicarboxylic acids and diphenols with the radicals I to III or their reactive derivatives, which may also be prepared in situ, if appropriate in the presence of chain terminators, branching agents and catalysts, at temperatures from 160° to 350° C., if appropriate under reduced pressure.

Because of their relatively low melt viscosity, the thermotropic polyesters according to the invention can be processed from the melt to give injection-moulded articles, filaments, fibres, ribbons and films, the resulting shearing forces producing molecular orientation which is influenced to a great extent by the magnitude of the shearing forces. They also exhibit a pronounced structural viscosity, that is to say the melt viscosity decreases sharply when the shearing forces are increased. Suitable processing methods are injection moulding, extrusion, pressing and melt spinning.

Mouldings possessing high tensile strength, extraordinary impact strength and great dimensional stability can be produced from the polyesters according to the invention. Since the polyesters are resistant to chemicals and flame-retardant, they are preferably used for the production of articles for the electrical industry, such as, for example, insulators, printed circuits, plug contacts and fittings, components of chemical apparatuses, such as, for example, pipes, container linings, rotors, sliding bearings and packings, components for the interior fittings of aircraft, and components of medical equipment, such as, for example, components of air-conditioning systems and valve parts.

The polyesters according to the invention can also be used as covering and coating material (in the form of a powder or dispersed). They are also very suitable for the production of reinforced or filled mouldings containing 5–65% by weight, relative to the reinforced and filled moulding composition, of reinforcing agents or fillers.

The invention therefore furthermore relates to the use of the new polyesters for the production of mouldings, filaments, fibres and films.

EXAMPLES

The impact strength $a_n$ and notched impact strength $a_k$ are tested on standard small bars according to DIN 53,453 (ISO/R 179) at 23° C., in each case for 10 test specimens. The determination of the flexural strength was carried out on standard small bars according to DIN 53,452 (ISO R 178). The flexural modulus of elasticity was determined according to DIN 53,457. The heat distortion resistance was measured by means of determinations of the Vicat B softening temperature according to DIN 53,460 (ISO 306).

EXAMPLE 1

The following substances were weighed into a 1 l plane-ground vessel which has a plane-ground lid, a stirrer, a nitrogen inlet and a distillation attachment connected to a condenser:

186.3 g (=1.35 mol) of p-hydroxybenzoic acid,
112.1 g (=0.674 mol) of terephthalic acid,
195.8 g (=0.674 mol) of 3-phenyl-4,4'-dihydroxybenzophenone,
330.8 g (=3.24 mol) of acetic anhydride,
0.05 g of magnesium acetate (anhydrous) and
0.05 g of antimony trioxide.

The mixture was heated to 180° C. under a nitrogen atmosphere by means of a salt bath. The distillation of acetic acid which began during this step was continued by increasing the temperature stepwise to 325° C. in the course of 3.5 hours. After the distillation was complete, the pressure was reduced to 20 mbar in several stages in the course of 45 minutes, and the melt was stirred for a further 15 minutes under these conditions.

During the vacuum phase, the viscosity of the resulting polyester melt increased sharply. The melt was therefore stirred slowly.

At the end of the distillation phase, a total amount of 370 g of acetic acid (contains residual acetic anhydride) had been collected.

A pale beige polyester having an intrinsic viscosity of 1.6 dl/g was obtained. An optically anisotropic melt phase was observed in the range of 225°–400° C.

EXAMPLES 2-5

In the reaction apparatus described in Example 1, and under the reaction conditions described there, the polyesters summarized in Table 1 were synthesized. The products specially indicated were milled after the melt polycondensation and subjected to subsequent condensation in the solid phase over a period of 24 hours under a pressure of about 1 mbar and at a temperature of 250° C.

EXAMPLES 6-8

Under the reaction conditions described in Example 1, and using the apparatus employed there, a few polyesters in which some of the terephthalic acid or 3-phenyl-4,4'-dihydroxybenzophenone has been replaced by other monomers were prepared. The reaction products obtained by melt polycondensation were milled, and subjected to subsequent condensation in the solid phase at 250° C./1 mbar over a period of 24 hours. Table 2 contains the composition and some physical data of these products.

To test the mechanical properties, standard small bars were produced by injection moulding from the polyesters of Examples 1-8. The polyesters were processed at temperatures between 280° and 330° C. The values measured are listed in Table 3.

We claim:

1. Thermotropic aromatic polyesters having repeating units of the formulae

  (I)

  (II)

  (III)

wherein
$Ar^1$ and $Ar^2$ are bivalent aromatic radicals having 6 to 18 C atoms, at least 90 mol% of the chain-extending bonds of which radicals are arranged coaxially or parallel in opposite directions, and at most 10 mol% of the chain-extending bonds of which radicals are arranged at angles, it being possible for these radicals to be substituted by 1 to 4 $C_1$–$C_4$-alkoxy groups and/or by 1 to 4 halogen atoms (preferably fluorine, chlorine or bromine), the molar ratio I/II being 30:70 to 85:15, and the molar ratio II/III being 0.95 to 1.05, characterized in that —O—$Ar^3$—O— consists of at least 50 mol% of radicals of the formula

TABLE 1

| Example | PHB (mol) | TA (mol) | 4,4'-PBP (mol) | 3',4-PBP (mol) | subsequent post-condensation | Intrinsic viscosity (dl/g) | Anisotropic phase (°C.) |
| --- | --- | --- | --- | --- | --- | --- | --- |
| 2 | 1.39 | 0.93 | 0.93 | | no | 1.41 | 250–400 |
| 3 | 1.46 | 0.86 | 0.86 | | no | 1.52 | 250–400 |
| 4 | 1.62 | 0.70 | 0.70 | | yes | 2.21 | 270–400 |
| 5 | 1.74 | 0.58 | 0.58 | | yes | 2.65 | 280–400 |
| 6 | 1.51 | 0.93 | | 0.93 | no | 1.48 | 270–400 |
| 7 | 1.62 | 0.70 | | 0.70 | yes | 3.26 | 285–400 |

PHB = p-hydroxybenzoic acid
TA = terephthalic acid
4,4'-PBP = 3-phenyl-4,4'-dihydroxybenzophenone
3',4-PBP = 3-phenyl-3',4-dihydroxybenzophenone

TABLE 2

| Example | PHB (mol) | TA (mol) | IA (mol) | 4,4'-PBP (mol) | Hy (mol) | Intrinsic viscosity (dl/g) | anisotropic phase (°C.) |
| --- | --- | --- | --- | --- | --- | --- | --- |
| 8 | 1.45 | 0.73 | — | 0.58 | 0.15 | 2.29 | 270–400 |
| 9 | 1.45 | 0.73 | — | 0.51 | 0.22 | 2.43 | 280–400 |
| 10 | 1.79 | 0.48 | 0.05 | 0.53 | — | 1.65 | 285–400 |

PHB = p-hydroxybenzoic acid
TA = terephthalic acid
IA = isophthalic acid
4,4'-PBP = 3-phenyl-4,4'-dihydroxybenzophenone
Hy = hydroquinone

TABLE 3

| Example | Vicat B (°C.) | $a_n/a_k$ (kJ/m$^2$) | Flexural strength (MPa) | Flexural modulus of elasticity (MPa) | Viscosity** (Pa.s) |
| --- | --- | --- | --- | --- | --- |
| 1 | 142 | 86*/44* | 201 | 6200 | 170/280° C. |
| 2 | 138 | 91*/42* | 185 | 6000 | 120/280° C. |
| 3 | 140 | 85*/51* | 213 | 6700 | 210/280° C. |
| 4 | 142 | 51*/27* | 195 | 7500 | 420/280° C. |
| 5 | 144 | 35/21* | 203 | 8000 | 550/280° C. |
| 6 | 149 | 62/27* | 205 | 6900 | 160/280° C. |
| 7 | 151 | 39/23* | 189 | 7600 | 560/290° C. |
| 8 | 145 | 37/24* | 185 | 7400 | 460/280° C. |
| 9 | 147 | 31*/20* | 197 | 8200 | 570/290° C. |
| 10 | 142 | 32*/29* | 207 | 7800 | 350/290° C. |

*fractured
**melt viscosity at a shearing rate of $10^3$ s$^{-1}$ at the stated temperature

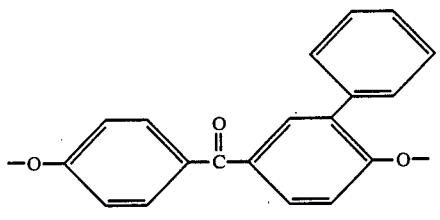

and/or

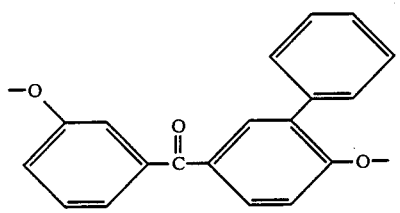

and at most 50 mol% of other bivalent aromatic radicals, the chain-extending bonds of which are arranged at angles or are arranged coaxially or parallel in opposite directions and the radicals having 6–18 C atoms, it being possible for these radicals to be substituted by 1 to 4 $C_1$–$C_4$-alkoxy groups and/or 1 to 4 halogen atoms.

2. Polyesters according to claim 1, characterized in that the radicals I and II exclusively represent aromatic units having chain-extending bonds which are parellel or coaxial and point in opposite directions.

3. Polyesters according to claims 1 and 2, characterized in that the repeating units III are exclusively 3-phenyl-4,4'-dihydoxybenzophenone radicals.

4. Polyesters according to claims 1 and 2, characterized in that the repeating units III are exclusively 3-phenyl-3',4-dihydroxybenzophenone radicals.

5. Polyesters according to claims 1–4, characterized in that $Ar^1$ and $Ar^2$ represent a 1,4-phenylene radical.

6. Polyesters according to claims 1–5, characterized in that the molar ratio I/II is 45:55 to 80:20.

7. Polyesters according to claims 1–5, characterized in that the molar ratio I/II is 60:40 to 78:22.

8. Process for the preparation of the polyesters according to claims 1–7 by reaction of the hydroxycarboxylic acids, dicarboxylic acids and diphenols with the radicals I to III or their reactive derivatives, which may also be prepared in situ, if appropriate in the presence of chain terminators, branching agents and catalysts, at temperatures from 160° to 350° C., if appropriate under reduced pressure.

9. Process according to claim 8, characterized in that it is followed by a subsequent solid-phase condensation.

10. Use of the polyesters according to claims 1–7 for the production of mouldings, filaments, fibres and films.

* * * * *